United States Patent [19]
Mylchreest et al.

[11] 3,877,915
[45] Apr. 15, 1975

[54] CONTROL SYSTEM FOR GLASSWARE MOLDING MACHINE AND METHOD OF MOLDING GLASS

[75] Inventors: George Dudley Mylchreest, Simsbury; Frederick Joseph Wythe, Hebron, both of Conn.

[73] Assignee: Emhart Corporation, Bloomfield, Conn.

[22] Filed: June 29, 1973

[21] Appl. No.: 374,818

[52] U.S. Cl. .................... 65/29; 65/160; 65/163; 65/DIG. 13
[51] Int. Cl. ............................................. C03b 9/26
[58] Field of Search ......... 65/160, 163, DIG. 13, 29

[56] References Cited
UNITED STATES PATENTS
| | | | |
|---|---|---|---|
| 3,634,660 | 1/1972 | Moran et al. | 65/158 |
| 3,762,907 | 10/1973 | Quinn et al. | 65/163 |

*Primary Examiner*—Arthur D. Kellogg
*Attorney, Agent, or Firm*—McCormick, Paulding & Huber

[57] ABSTRACT

The normal cycle of the typical I. S. type of glassware forming machine is rendered more versatile by dividing it up into modes related to the thermodynamics of the dynamic glassware forming process. These modes are defined by boundaries which can be related to the usual machine functions, and this new systems approach permits a computer to control many of these machine functions within a particular "mode" while the boundaries of the mode itself are varied within predetermined limits. A pulse generator is used to trigger a counter means which develops counts for use by a computer for comparison with desired values to operate a solenoid controlled valve block. The further feature disclosed herein resides in the designation of certain action signals for operation of the mechanical means as boundaries between thermodynamic modes of the glassware forming cycle. These boundaries will follow preset "counts" which can be varied, within limits, to effect longer or shorter settle blow time, counter blow time, final blow time, or parison reheat time, etc.

8 Claims, 2 Drawing Figures

CONTROL SYSTEM FOR GLASSWARE MOLDING MACHINE AND METHOD OF MOLDING GLASS

BACKGROUND AND SUMMARY OF INVENTION

The advantages of the present invention can best be delineated by reference to the conventional cycle of operation of the Hartford I. S. machine. However, the description to follow defines this cycle by reference to certain boundaries which relate the thermodynamics of the glassware forming process to the mechanical machine functions normally provided in the conventional machine. These boundaries permit the use of a computer or controller to be so programmed that the machine operator can manually alter these boundaries by predetermined increments to improve the machine's efficiency at the press of a button, the related machine functions being automatically revised as required in accordance with the program, and the selected change being automatically cancelled if any of these functions will be outside of predetermined limits.

In a typical Hartford I. S. type of glassware forming machine, molten glass gobs are delivered, by means of a gob distribution system, in a predetermined sequence to the upwardly open blank molds of the various machine sections. Each section comprises a self-contained unit which includes a blank mold station and a blow mold station. The gob of molten glass is formed into a parison at the blank station, and then transferred to the blow station by a neck ring arm which includes a neck mold. The neck mold not only mates with the blank mold at the blank station but also serves to support the parison during transfer to the blow station.

The blank mold may be of the split or the solid type but in the description to follow a two part split blank mold is provided, and is adapted to mate with the neck mold. The neck mold is also of the split type, and is annular in shape with a central opening to receive a vertically reciprocable plunger which presses the gob into the blank mold in the "press and blow" process, or which plunger is associated with a thimble to permit the parison to be formed by the "blow and blow" process. This latter process provides for "counter blow" air at the blank station in addition to the "final blow" air at the blow station. The description to follow contemplates forming glassware by a "blow and blow" process, but could also be adapted for use in the "press and blow" process.

The glass gobs are formed at a predetermined rate, and are fed through a distribution system to the various blank mold cavities. Each blank cavity is upwardly open, and a funnel is usually provided to move in onto the closed blank mold for guiding the gob into such cavity. The gob drops through the funnel, into the cavity, and into the neck mold, which is always closed except for a short time at the blow station for release of the parison. In this "delivery mode" of the machine the plunger and the thimble must be raised to define the neck opening of the ware. This initial mode is triggered either upon "start up" of the machine, or of a master section thereof, or in accordance with the gob distributor system.

The next mode of operation of the machine can be characterized as one of "settling" the gob or charge into the neck mold. This is accomplished in the usual "blow and blow" process by bringing a baffle down onto the funnel, and providing air to the baffle for "settling" the charge in the blank mold. If no funnel is used in loading the gob, the baffle may move directly in on top of the blank mold. As so configured the blank station of the machine section is in its "parison settle" mode. After settle blowing has been completed the baffle, and funnel, are returned to their inactive positions, respectively.

The next mode of operation of the machine occupies only a short time, and can be characterized as "parison corkage reheat." The plunger moves downwardly away from the neck of the parison allowing the heat of the glass to stabilize in this part of the parison. This short pause softens the glass surface by internal conduction, at least in the area where the plunger tip has caused it to cool during the "delivery" and "settle" modes, and as so configured the machine is in its "corkage reheat" mode.

The next mode of operation of the machine can be characterized as one of "parison forming," and in the "blow and blow" process such forming is carried out by introducing counter blow air to the softened area of the parison. The mechanical machine configuration is only altered from the previous mode in that the baffle is lowered onto the blank mold. This mode will see the gob expanded to fill the upper regions of the blank cavity defined by the blank mold and by the baffle. After allowing time for this preliminary forming the counter blow air is turned off, the baffle is returned to its inactive position, and the split blank mold is ready for opening. As so configured the blank station of the machine is in its "parison forming" or "counter blow" mode.

The next mode involves "reheating" parison and the initial phase is accomplished simply by opening the split blank mold. With the blank mold open the parison is not in contact with any mold parts except the neck mold. This configuration allows the heat stored in the thick walled parison to raise the temperature of its external surfaces, hence the derivation of the term "reheat" mode. This phase can be called "blank side reheat."

Once the blank mold has completely opened, the neck ring arm inverts the neck mold and the parison along with it. This phase of the reheat mode can be characterized, thermodynamically, as "invert reheat." This reheating continues at least until the parison has been transferred to the blow station. As the parison reaches the blow station the third phase of reheat occurs. The blow mold closes around the parison and around a bottom plate, which will be spaced below that end of the parison opposite its neck or open end. The blow mold has an upper portion which supports the parison from just below its finish, allowing the neck mold to be opened prior to revert, or return movement of the neck ring mold. The neck ring mold recloses during return movement so that the blank mold can close around it once the neck mold has returned to the blank station.

The next mode involves final forming of the body of the ware, the finish of the ware having been formed by the neck mold at the blank station and during transfer. The final blow air is delivered to the interior of the parison by a blow head which moves down onto the top of the closed blow mold. After a preset time for final blowing the air is turned off and the blow head returned to its inactive position. The blow mold opens and take-out tongs (open) are swung into the blow station. The tongs close around the newly formed ware and the article is lifted off the bottom plate for delivery to the deadplate portion of a take-away conveyor system.

DETAILED DESCRIPTION

Figure 1:
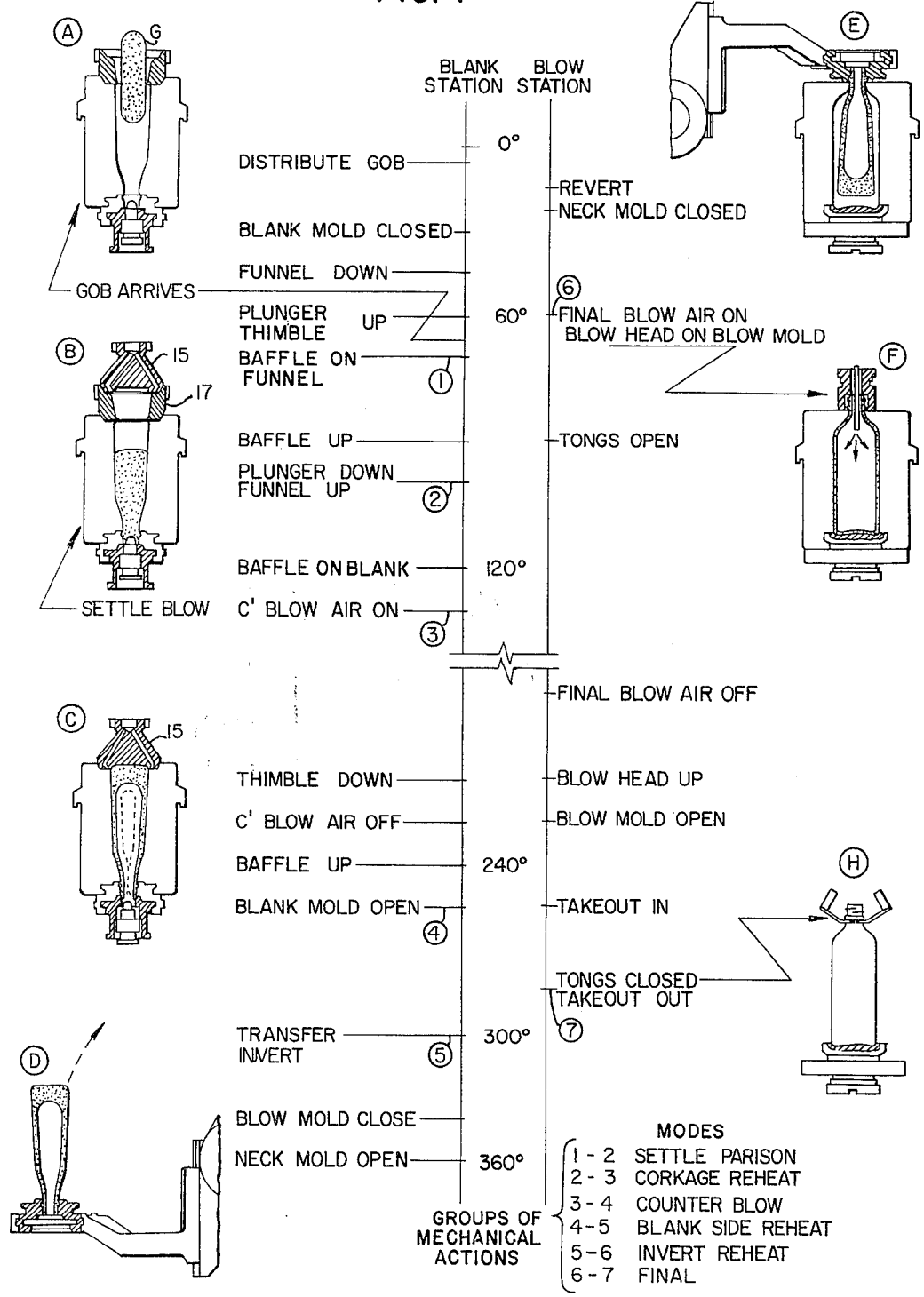
FIG. 1 is a schematic breakdown of the typical Hartford I. S. machine cycle, but with the modes of the typical cycle delineated in accordance with the present invention.

Turning now to the drawings in greater detail, FIG. 1 shows the several "modes" of a typical I. S. machine cycle, which modes are defined by discrete boundaries. These boundaries are capable of being conveniently set from a console 10 best shown in FIG. 2 through a priority program 14. The program 12 monitors inputs to a computer 30 to give precedence to the following; emergency stop, pulse generator, and the console itself. Revisions to the "boundaries" are provided from, and are limited by a "table of settings" subprogram 16. A control program 18 not only compares the pulse count from counter 20, with that stored in the table 16, but also assures that the timing of proposed changes occurs at some predetermined phase of the machine cycle. The "table of settings" subprogram 16 preferably includes minimum time separation between adjacent boundaries within the machine cycle.

Considering the settle blow mode in greater detail, the initial boundary condition defining this mode is chosen to be when the baffle 15 moves onto the funnel 17. The air for settle blowing is turned on at this time also. More particularly, the settle blow mode of operation is initiated, under the control of a program 18 which has as one input, the preset time of opening of a valve which controls the pneumatic actuator for the baffle. More particularly, the settle blow mode of operation is initiated under the control of program 18 in the computer, which compares two inputs, the current total count shown by the counter 20 and the preset count (stored in "table of settings," subprogram 16) for the opening of the valve which controls the pneumatic actuator for the baffle. When these two values are found to be equal, an actuation of timing signal is issued to the baffle. From FIG. 1 a preset "count" equivalent to 70° has been chosen for this timing signal. Actually, each boundary depicted in FIG. 1 comprises an initial condition for one mode of operation of the machine, and a final condition for another mode. For example, the first boundary referred to hereinabove also defines the end of the delivery mode, which mode will be discussed in greater detail herein below. However, many mechanical machine actions are to be handled within each of these modes. It is in the system of choosing of one "boundary" to fix several of these machine actions that the present invention resides.

The machine itself 22 comprises a plurality of individual sections which preferably operate in synchronism with one another. Under present practice, these sections are each fed at least one gob of molten glass from a single feeder 24, so that it is preferable to provide for the synchronized operation of the various machine sections. Since the feeder itself must also operate in synchronization with the machine, a pulse generator 26 is driven by the feeder drive motor 28, and provides a series of pulses to the computer 30 which operates the machine 22 through a plurality of individual solenoid controlled valve blocks 32.

The computer's output, represented schematically by the arrow 34, must first be decoded from its binary condition, to signals suitable for operating conventional solenoids. Suitable circuitry 40 is provided for this purpose. The reader is referred to British Pat. No. 1,079,385 dated June 15, 1965 for a more detailed description of this portion of the apparatus of FIG. 1. However, in the present system, the computer 30 represents a substantial improvement over the primitive approach shown in the British patent in that limits are imposed on the degree of changes to certain key parameters, or boundaries, which boundaries in turn control all of the other parameters in accordance with a predetermined program.

Figure 2:
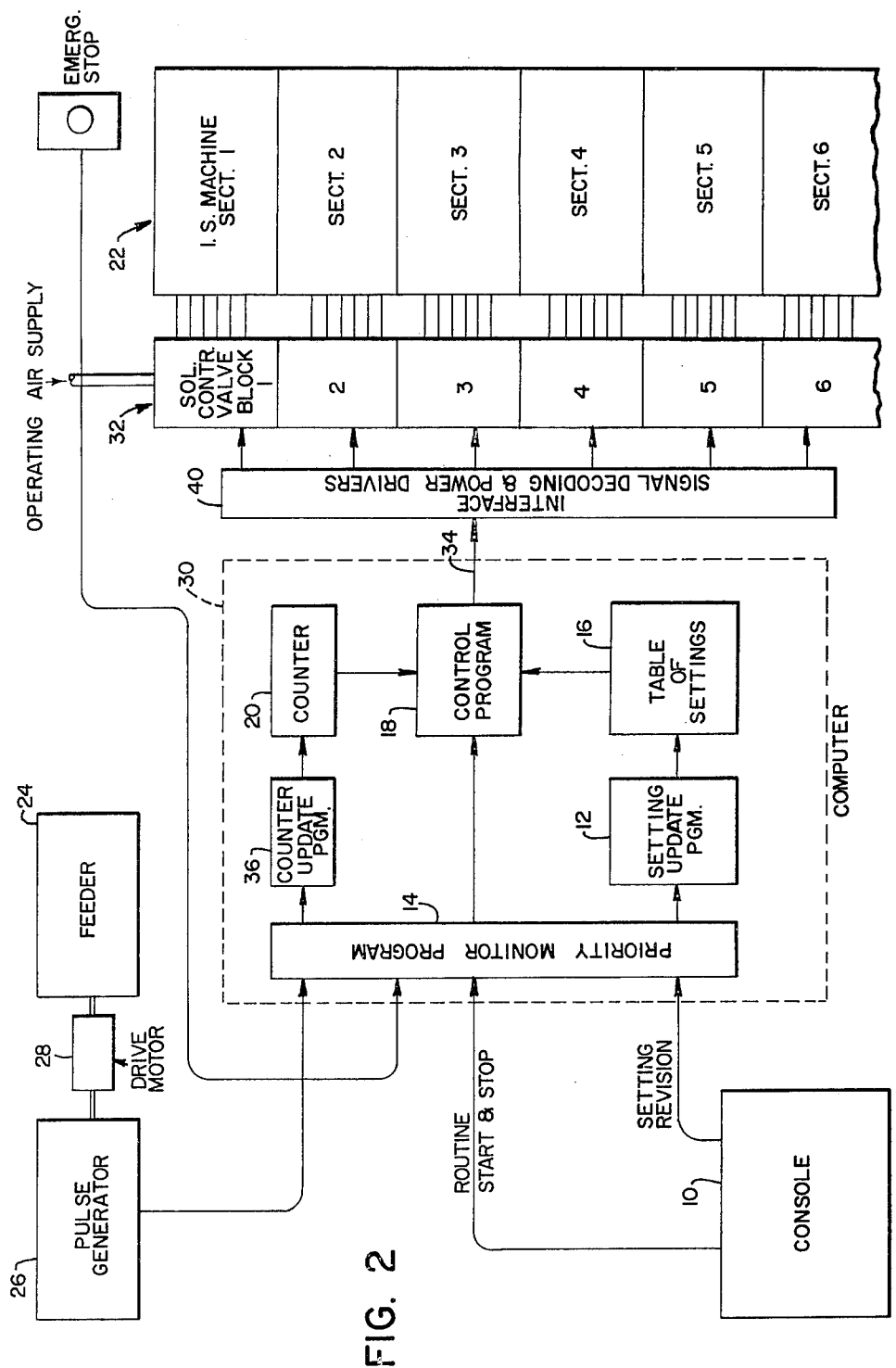
FIG. 2 is a block diagram of a system set-up to take advantage of the invention suggested in FIG. 1.

Considering FIG. 2 in greater detail, and assuming that the machine 22 has been previously set up and operating, the pulse generator 26 feeds pulses continuously to the computer 30, and more particularly to a "Priority Monitor Program" 14 which will pass these pulses through a timing or update program circuit 36 for advancing the counter 20. The counter 20 provides an input to the control program 18 whereby the latter is continuously aware of the instantaneous cycle status of each section of the machine. For example, in FIG. 1, a complete cycle of a particular section is represented schematically, 0°–360° representing one cycle or period. The angular position of the prior art timing drum in such a machine section was always used to reference the operation of the various components, and this reference has been carried over in FIG. 1. However, in the counter 20 any convenient numbering system could be adopted, such as 720 counts per cycle, or 999 counts per cycle. In the description to follow 360 counts will be used to refer to the operation of machine components but it will be understood that the actual pulse count per cycle might be any convenient 3 digit number, and would preferably be at least 720.

The control program 18 also receives an input from the "table of settings" 16, and FIG. 1 shows typical values of these settings for a conventional "blow and blow" process of the type used to form so-called "narrow neck glassware." More particularly, FIG. 1 shows a cycle for a typical machine section, the blank mold station being depicted on the left hand side of this view and the blow mold station at the right hand side. As illustrated, the starting point of the cycle is assumed to be shortly before the gob G is formed at the feeder 24. A scoop or other gob distribution device is air operated under the control of a solenoid valve to move into position (between 0°–10°) for conveying the gob G through a fixed trough or chute (not shown) to the appropriate blank station. Actually the gob G arrives at the position shown in FIG. 1A between 55° and 70° depending upon the distance the gob must travel from the feeder to the blank station of that particular machine section. The portion of a 360° cycle required to close the blank mold has been found to be approximately 20°, and this movement must be completed prior to the plunger's arrival at its "up" position. Once the gob has been delivered into the closed blank mold, with the funnel, thimble, and plunger all in their active positions, the blank station is ready for the parison settle mode, or the settle blow mode as it will be referred to herein. As depicted in the mode key in FIG. 1, the machine's cycle is divided up into several discrete modes, six such modes defining that part of the cycle between approximately 70° and 285°. The unmentioned mode, from approximately 285°, through 360°, to 70° can be considered to be a gob delivery or ware take-out mode but the advantages to the present invention will be best realized in the range of modes depicted in FIG. 1.

Although the parison settle or settle blow mode is defined in FIG. 1 as starting at the baffle on signal (approximately 70°) it is the end of this mode which is used by the computer 30 to control the operation of those machine components related to the settle blowing of the parison. The action signal which will start the plunger down (approximately 105°) is selected as a boundary for the computer to control other action signals associated with both up and down motion of the baffle, and funnel up motion in addition to plunger down motion. The settle blow air is turned on and off automatically when the baffle is moved down and up respectively, so that a separate action signal for it is not required in the computer. Thus, movement of the baffle onto the funnel, turning on and off of the settle blow air, and movement of the funnel are all programmed to occur at selected times prior to the 105° or "second" boundary in FIG. 1. This information is stored in the "table of settings" 16, and is provided for varying the 105° boundary within certain limits.

The console 10 has manually operable means, such as thumb wheels for example, for setting or resetting the foregoing 105° boundary. The priority monitor 14 will slectively transmit a proposed change to this 105° boundary to the update setting program unit 12, which unit has a subprogram contained therein which will determine whether the proposed change will exceed predetermined limits set for it. For example, the machine operator may want to allow for more time during each cycle for settling the gob or charge into the blank mold (FIG. 1B). He would by means of his console introduce an appropriate signal to the unit 12 and thereby cause this 105° setting to be increased incrementally. If the succeeding mode, "corkage reheat," does not require the 25° allocated to it for forming the particular glassware shape involved, as if only 20° is required for "corkage reheat," for example, then the operator will be able to increase the time available for settle blow up to a limit of 110° in this case. Since the settle blow air is turned on as soon as the baffle moves down toward the funnel, and since this timing is not affected by revising the settle blow boundary (105°) then an increase of 5° may be achieved in the settle blow mode.

It will be apparent that some minimum settle blow time must also be established. Once such a limit is established, empirically or otherwise, this fact can be stored in the unit 12, as can the limit referred to in the preceding paragraph related to "corkage reheat."

The modes of operation for the typical cycle shown in FIG. 1 have boundaries associated therewith. Certain of these boundaries between adjacent modes have been selected to determine the timing of certain machine functions through the program stored in the "table settings" 16. These boundaries can be manually altered to vary the fractional share which the mode of the machine will have during a given machine cycle. The latter variations are limited by a subprogram stored in the unit 12.

The "corkage reheat" mode is defined between the "second" or settle blow boundary discussed above, and by a "third" boundary associated with turning the counter blow air on. As mentioned above, the total share of each cycle to be allocated to "corkage reheat" will depend on the configuration of the neck portion of the glassware. In forming narrow neck ware by a "blow and blow" process only 25° is normally so spent, and this time may be cut to 20°.

Counter blowing requires that the gob be stretched upwardly from the FIG. 1B to FIG. 1C configuration by introducing air through the thimble opening into the cavity formed by the plunger. This air will be available at the baffle 5° after the baffle receives its pneumatic power for moving onto the blank mold, and the "boundary" for determining the "share" of each machine section cycle available for counter blow comprises the blank mold open action signal. As shown in FIG. 1 this occurs at approximately 260°. The following machine components are moved in the directions indicated at preprogrammed times prior to this "fourth" boundary condition.

The thimble moves down at this boundary (260°) minus 35° (or 225°).

The counter blow air is turned off at this boundary (260°) minus 30° (or 230°)

The baffle is moved up out of its active position at this boundary (260°) minus 20° (or 240°).

Finally, and still with reference to the counter blow mode, the operator can revise his "fourth" boundary (260°) and thereby increase or decrease counter blow time within preprogrammed limits. Such limits are dictated on the low side of such considerations as continuing counter blow air flow until the internal cavity formed in the parison has properly set to permit the transfer of the parison from the blank to the blow station without distortion or the like. The upper limit for counter blow air will also be affected by the transfer requirement, as affected indirectly by the time necessary for transfer and final forming at the blow station.

The blank side reheat represents only one phase of the total reheat time consumed by the parison not only at the blank station once the blank mold starts to open, but also during transfer, and at the blow station prior to final blowing the parison after closing of the blow mold. All of these times totalled must be long enough to assure that the temperature of the outer surface of the glass rises sufficiently to permit final forming the article by blowing at the blowing station. A more significant consideration prior to actual transfer, or "invert," is that the blank mold must be completely opened. This movement will take at least 25°, and thus the blank side reheat normally expires at well over 285°, and usually at approximately 300°. However, the initiation of this invert motion constitutes a boundary for the "invert reheat," as well as for the "blow side reheat," and it will be apparent that some latitude is available for varying this particular boundary. For example, a lower limit of 285° and an upper limit dictated by the thermodynamic requirements of final blowing can be preset in the unit 12 to provide the necessary subprogram for "invert" or parison transfer timing.

Under the invert reheat and blow side reheat mode of operation of the machine the following machine functions will be determined directly from the selected "invert" boundary. The split blow mold will move toward its closed position at "invert" plus 20°. The split neck mold will open at "invert" plus 70°, and reclose at "invert" plus 85°. The invert transfer motion of this neck mold will return or revert at "invert" plus 75°.

The next mode of operation will occur at the blow station, and hence at the same time that a new charge or gob is being delivered to the blank station. The final forming mode depicted in FIG. 1F has as its "boundary," the turning on of the air to final form the ware in the now closed blow mold. Thus, the blow head must be in place, and the neck mold and transfer mechanism must be clear of the blow station for this mode.

The final mode depicted in FIG. 1 is called "take-out cooling" and the "boundary" selected for this mode comprises the initial movements of the take-out arm for removing the newly formed article from the blow station and taking it out of the machine. Other actions which are programmed to occur prior to the boundary (285°) which controls this mode of the machine are as follows: Final blow air is turned off at 285°–75° (or 210°), the final blow head is moved toward its inactive position at 285°–55° (or 230°the blow mold is opened at 285°–50° (or 235°), the take-out arm moves toward its active position at 285°–40° (or 245°), the take-out tongs move toward their closed position at 285°–0° (or 285°), and the tongs open at a time not controlled directly by this "count" of 285°, but instead at 100° of the next machine cycle, and hence of every such cycle. Other actions subsequent to those referred to in this paragraph, control the operation of the push-out mechanisms for moving the ware off a deadplate, where they have been deposited by the take-out, onto a take-away conveyor. This latter mechanism may be operated simultaneously with turning off the final blow air, that is at an action signal occurring at 285°–75° (or 210°). As previously mentioned, the machine operator may vary this boundary of 285° within established limits to increase or decrease the time available for final blowing the ware. The unit 12 includes a subprogram for limiting the selected revisions to values which preclude final blow being carried out once the next parison has started its transfer (invert) motion for example.

The foregoing description illustrates the various modes of operation of a typical machine section. The other machine sections operate in a similar manner, and hence need not be described in detail herein.

We claim:

1. In a multi-section glassware forming machine, each of which sections includes at least the following mechanical means:
    a. means for delivering gobs of molten glass to a blank station in the machine section at a rate, which rate can be varied,
    b. a blank mold operable to and from an active position at the blank station,
    c. a split neck mold operable between open and closed positions whereby said neck mold is adapted to cooperate with the blank mold to define a parison cavity,
    d. a plunger operable to and from an active position at the blank station, and means for settling the gob into the neck mold,
    e. secondary parison mold defining means operable to and from an active position at said blank station, and cooperating with said blank mold to define said parison cavity,
    f. transfer means for moving said split neck molds and the parison formed in said cavity out of said blank station and into a blow station,
    g. a split blow mold operable open and closed positions at said blow station,
    h. means for final forming the parison at said blow station, and
    i. take-out means for removing the final blown article from said blow station,
    said machine being further characterized by the improvement comprising:
    j. means for generating a series of pulses related in frequency to the rate at which gobs are delivered to the particular machine section,
    k. computer means including a counter for counting said pulses,
    l. said computer means including storage means for recording a preset pulse count at which each of said mechanical means is activated or deactivated,
    m. said computer means including control means for comparing the instantaneous pulse count with said preset pulse counts and providing action signals in response to said comparison to actuate the operation of said mechanical means within each machine section cycle, and
    n. said computer storage means further including means for arranging said preset pulse counts to define groups of actions of said mechanical means within each such machine section cycle, each of which groups includes an action of one of said mechanical means which defines a boundary between thermodynamic modes of the glassware forming cycle, said computer storage means also including means for shifting any boundary by a desired number of counts, with all preset counts of the actions of said mechanical means of that particular group being shifted a similar amount, whereby thermodynamic modes may be altered.

2. The improvement as defined in claim 1 wherein said computer means includes means for resetting said counter to a reference pulse count when a predetermined number of pulses has been generated corresponding to a complete cycle of the machine section.

3. The improvement of claim 1 further characterized by said computer storage means also including means to limit the shifting of a boundary with respect to a proximate boundary within a predetermined range.

4. The improvement of claim 1 wherein said mechanical means comprise fluid pressure operated devices, and wherein said action signals comprise electric output signals from said computer means, a plurality of solenoid controlled valves for selectively activating and deactivating each fluid device from a source of fluid under pressure, and interface means between said computer output signals and said electric solenoids.

5. The improvement of claim 1 further characterized by normal stop means for shutting down the machine section in event of emergency, and said computer storage means further including priority means for achieving a programmed stop when the normal stop means is activated and a higher priority immediate stop when said emergency stop means is activated, said means for shifting a boundary by a desired number of counts having a lower priority in relation to both said normal and emergency stop means.

6. In a multi-section glassware forming machine, each of which sections includes at least the following mechanical means:
    a. means for delivering gobs of molten glass to a blank station in the machine section at a rate, which rate can be varied, b. a blank mold operable to and from an active position at the blank station,
c. a split neck mold operable between open and closed positions whereby said neck mold is adapted to cooperate with the blank mold to define a parison cavity,
d. a plunger operable to and from an active position at the blank station, and means for settling the gob into the neck mold,
e. secondary parison mold defining means operable to and from an active position at said blank station, and cooperating with said blank mold to define said parison cavity,
f. transfer means for moving said split neck molds and the parison formed in said cavity out of said blank station and into a blow station,
g. a split blow mold operable between open and closed positions at said blow station,
h. means for final forming the parison at said blow station, and
i. take-out means for removing the final blown article from mid blow station,
the method of controlling the glassware forming process comprising:
j. generating a series of pulses related in frequency to the rate at which govs are delivered to the particular machine section,
k. counting said pulses in a counter of a computer means,
l. storing a preset pulse count in said computer means at which each of said mechanical means is activated or deactivated,
m. comparing the instantaneous pulse count with said stored preset pulse counts in said computer means and providing action signals in response to said comparison to actuate the operation of said mechanical means within each machine section cycle,
n. arranging said preset pulse counts in said computer means to define groups of actions of said mechanical means within each such machine section cycle,
o. defining the action of one of said mechanical means in each group as a boundary between two adjacent thermodynamic modes of the glassware forming cycle, and
p. shifting the preset counts of actions of all said mechanical means within a group by a similar amount to the number of counts by which the action of said mechanical means defined to be a boundary in that particular group is shifted, whenever it is desired to alter a thermodynamic mode by shifting the boundary between two adjacent modes.

7. The method as defined in claim 6 further including the step of resetting said counter to a reference pulse count when a predetermined number of pulses has been generated corresponding to a complete cycle of the machine cycle.

8. The method as defined in claim 6 further including the step of limiting the shifting of a boundary with respect to a proximate boundary within a predetermined range.

* * * * *

UNITED STATES PATENT OFFICE
CERTIFICATE OF CORRECTION

Patent No. 3,877,915           Dated  April 15, 1975

Inventor(s) George Dudley Mylchreest and Frederick Joseph Wythe

It is certified that error appears in the above-identified patent and that said Letters Patent are hereby corrected as shown below:

Col. 2, line 32, "reheating parison" should be --reheating the parison--.

Col. 3, line 46, "of" should be --or--.

Col. 6, line 30, "of" should be --by--.

Col. 7, line 18, insert --),-- after 230°.

Col. 7, line 66, after "operable" insert --between--.

Col. 9, line 22, "mid" should be --said--.

Col. 9, line 26, "govs" should be --gobs--.

Signed and Sealed this nineteenth Day of August 1975

[SEAL]

Attest:

RUTH C. MASON
Attesting Officer

C. MARSHALL DANN
Commissioner of Patents and Trademarks